United States Patent
Huang et al.

(10) Patent No.: US 10,833,794 B2
(45) Date of Patent: Nov. 10, 2020

(54) DATA TRANSMISSION BOOSTING SYSTEM

(71) Applicant: FORGAMERS INC., Taipei (TW)

(72) Inventors: Chih-Jen Huang, Taipei (TW);
Yu-Hsiang Wu, Taipei (TW);
Ming-Tze Hung, Taipei (TW);
Chih-Hsiu Hung, Taipei (TW)

(73) Assignee: FORGAMERS INC., Taipei (TW)

( * ) Notice: Subject to any disclaimer, the term of this patent is extended or adjusted under 35 U.S.C. 154(b) by 0 days.

(21) Appl. No.: 16/402,774

(22) Filed: May 3, 2019

(65) Prior Publication Data

US 2020/0195369 A1    Jun. 18, 2020

(30) Foreign Application Priority Data

Dec. 14, 2018  (TW) .............................. 107145241 A (51) Int. Cl.
*H04L 1/00*  (2006.01)
*A63F 13/31*  (2014.01)
*H04L 1/16*  (2006.01)
*A63F 13/35*  (2014.01)

(52) U.S. Cl.
CPC ............ *H04L 1/0002* (2013.01); *A63F 13/31* (2014.09); *A63F 13/35* (2014.09); *H04L 1/0025* (2013.01); *H04L 1/1671* (2013.01)

(58) Field of Classification Search
CPC .... H03G 3/3042; H03G 3/3052; A63F 13/31; A63F 13/35; H04L 1/0002; H04L 1/0025; H04L 1/1671
See application file for complete search history.

(56) References Cited

U.S. PATENT DOCUMENTS

| | | |
|---|---|---|
| 6,856,991 B1 | 2/2005 | Srivastava |
| 7,062,556 B1 | 6/2006 | Chen et al. |
| 7,062,571 B1 | 6/2006 | Dale et al. |
| 7,523,454 B2 | 4/2009 | Romero et al. |
| 9,917,727 B2 | 3/2018 | Hong et al. |
| 9,954,785 B1 | 4/2018 | Lu et al. |
| 2005/0030926 A1* | 2/2005 | Qian ..................... H04W 52/32 370/335 |
| 2013/0194924 A1* | 8/2013 | Zhang ................... H04W 28/10 370/232 |
| 2014/0101331 A1* | 4/2014 | Bartlett ................... H04L 47/13 709/233 |

* cited by examiner

*Primary Examiner* — Gregory B Sefcheck
*Assistant Examiner* — Debebe A Asefa (57) ABSTRACT

A data transmission boosting system includes a boosting server and a client boosting device, wherein the boosting server and the client boosting device are connected to the internet respectively. The client boosting device further includes a data receiving module, a classifying module, and a transmitting module. The data receiving module receives data packets from at least one terminal device. The classify module classifies the data packets as data packets to be boosted, non-boosting data packets, or unknown data packets. The transmitting module transmits the data packets classified as the data packets to be boosted to the boosting server through the internet, and transmits the data packets classified as the non-boosting data packets to the internet.

9 Claims, 6 Drawing Sheets

DATA TRANSMISSION BOOSTING SYSTEM

CROSS-REFERENCE TO RELATED APPLICATIONS

The present application is based on, and claims priority from, Taiwan Patent Application No. 107145241, filed Dec. 14, 2018 the disclosure of which is hereby incorporated by reference herein in its entirety.

BACKGROUND OF THE INVENTION

Field of the Invention

The present invention provides a data transmission boosting system, and more particularly, provides a data transmission boosting system for boosting the transmission of the data packets sent from the game devices, the specific electronic devices or the application programs by hardware.

Description of the Prior Art

In recent years, various emerging industries have rapidly grown with full development of the internet technology to the scale like the traditional industries. For example, the electronic games now have a great influence on the economy and the society along with full development of the internet technology, and E-sports becomes one of the formal sports. E-sports is a form of competition for video games. It uses the electronic device as the sports equipment, such as computers, game consoles, arcades, or smart phones. However, E-sports focuses on the intelligence and reaction competitions among players.

In early years, E-sports which does not need the internet has already existed, but it was not popular for its property and the impressions from society. Along with the development of the internet technology, the scale of the electronic games extends from the surroundings of the players to anywhere connected to the internet, and the players can play the electronic games with other players all over the world, so as to bring the E-sports popular. E-sports is easier to link with the internet and the internet media, such as online streaming or network platforms built by the game console manufacturer, than other sports are. Therefore, E-sports grew more rapidly than other sports, and the peripheral products and industries, such as game consoles, game software, smart phones for E-sports, software or hardware for online streaming, and advertisement, are also improved. E-sports have already become one of the most popular and highest output industries.

The difference between E-sports and the other sports is that the performance of the players of E-sports or gamers would be affected by the hardware and the network performance. Most video games in the present days can be played with the internet, so that the network speed or the transmission speed of the data on the internet would affect the performance and the game experience of the players to a certain degree. As aforementioned, the scale of the electronic games extends to the whole world through the internet. However, when two players at the opposite sides of the world connect with each other, the long data transmission route would make higher delay to further affect the performance and the game experience of the players.

In practice, the data transmission speed on the internet is limited physically, and then the network delay would always exist. However, the route of the data transmission can be optimized to achieve the network boosting, and a boosting server on the internet is capable of calculating the optimized route.

The data packets sent by the computer or smart phone are not limited to the game data packets. It is costly if transmitting all data packets to the boosting server, and furthermore, the transmissions of the non-boosting data packets would also lower the efficiency or performance of the boosting server and the user's device to reduce the advantage of the network boosting. In the prior art, the network boosting for the data packets of the computer games or smart phone games can be achieved by the boosting application programs installed in the computer or smart phone, such as WTFast. That is to say, the network boosting is achieved by the software. The aforementioned boosting application programs monitor the executions of the game programs in the operation system, and transmit the data packets generated by the game programs to the boosting server through the internet. Therefore, the data packets generated by the other programs, which are not game programs, would not be transmitted to the boosting server.

However, the game console or other devices for entertainments, unlike the computer or smart phone, could not install a boosting application program to boost the game data packets. It means that the network boosting function by software could not support the game console. The game console nowadays sends not only game data packets but also other data packets. For example, some game consoles have the function of browsing websites, or upload/download game software on the platform built by the console manufacturer. Therefore, the data packets generated by the game console or other devices for entertainments also need to be classified and boosted selectively.

On the other hand, the necessary features for classifying the data packets of the boosting function in the prior art is pre-provided by the user or the manufacturer. The necessary features for classifying the data packets of the boosting function need to be updated by the manufacturer when the user or the player would like to boost the game which is not in the boosting list. The update for great launching quantity of new games would cause the user great inconvenience.

Therefore, a hardware type data boosting mechanism which is capable of updating the classifying criteria to precisely classify the data packets as data packets to be boosted or the others is necessary, so as to solve the aforementioned problems in the prior art.

SUMMARY OF THE INVENTION

In response to the above-mentioned problems, an objective of the present invention is to provide a data transmission boosting system to precisely classify the as data packets to be boosted or others.

According to an embodiment of the present invention, the data transmission boosting system includes a boosting server and a client boosting device. The client boosting device and the boosting server are connected to the internet. The client boosting device includes a data receiving module, a classifying module, and a transmitting module. The data receiving module is capable of connecting with the electronic devices and receiving the data packets sent from the electronic devices. The classifying module is connected to the data receiving module for classifying each of the data packets as one of data packets to be boosted, non-boosting data packets, and unknown data packets. The transmitting module is connected to the classifying module and the internet for transmitting the data packets classified as the data packets to be boosted to the boosting server through the internet and transmitting the data packets classified as the non-boosting data packets to the internet.

Wherein, the data receiving module of the client boosting device includes a plurality of connecting ports for connecting with electronic devices respectively. The electronic devices include at least one of a terminal device and a network switching device.

Wherein, the network switching device includes one selected from the group consisting of routers, hubs, switches, bridges, and broadband routers.

Wherein, the client boosting device further includes a sorting module connected to the classifying module. The sorting module is configured for receiving the data packets classified as the data packets to be boosted, respectively calculating the quantity ratio of the data packets to be boosted sent by the electronic devices, and sorting the priorities to transmit the data packets sent by the electronic devices to the boosting sever.

Wherein, the client boosting device further comprises a protocol enhancing module connected to the sorting module for receiving the data packets classified as the data packets to be boosted. The protocol enhancing module stores a protocol enhancing program for enhancing the protocol of the data packets.

Wherein, the data packets to be boosted are game data packets.

Wherein, the client boosting device further includes a learning module connected to the classifying module. The learning module is configured for analyzing the data packets classified as the unknown data packets by machine learning.

Wherein, the classifying module stores a classifying model having a plurality of classifying features. The classifying module can respectively classify the data packets according to the classifying model and the packet information of the data packets. The learning module analyzes the data packets classified as the unknown data packets by machine learning to obtain new classifying features of data packets classified as the unknown data packets, and then feedbacks the new classifying features to the classifying module for updating the classifying model.

Wherein, the classifying features include port information, game IP address, and domain string of the application layer.

Where, the client boosting device further includes a router, and the router includes the transmitting module.

As aforementioned, the data transmission boosting system of the present invention is capable of precisely classifying the data packets as data packets to be boosted or the others and updating the classifying criteria automatically, so as to solve the aforementioned problems in the prior art.

BRIEF DESCRIPTION OF THE APPENDED DRAWINGS

Some of the embodiments will be described in detail, with reference to the following figures, wherein like designations denote like members, wherein.

The advantages, spirits, and features of the present invention will be explained and discussed with embodiments and figures as follows.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications can be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
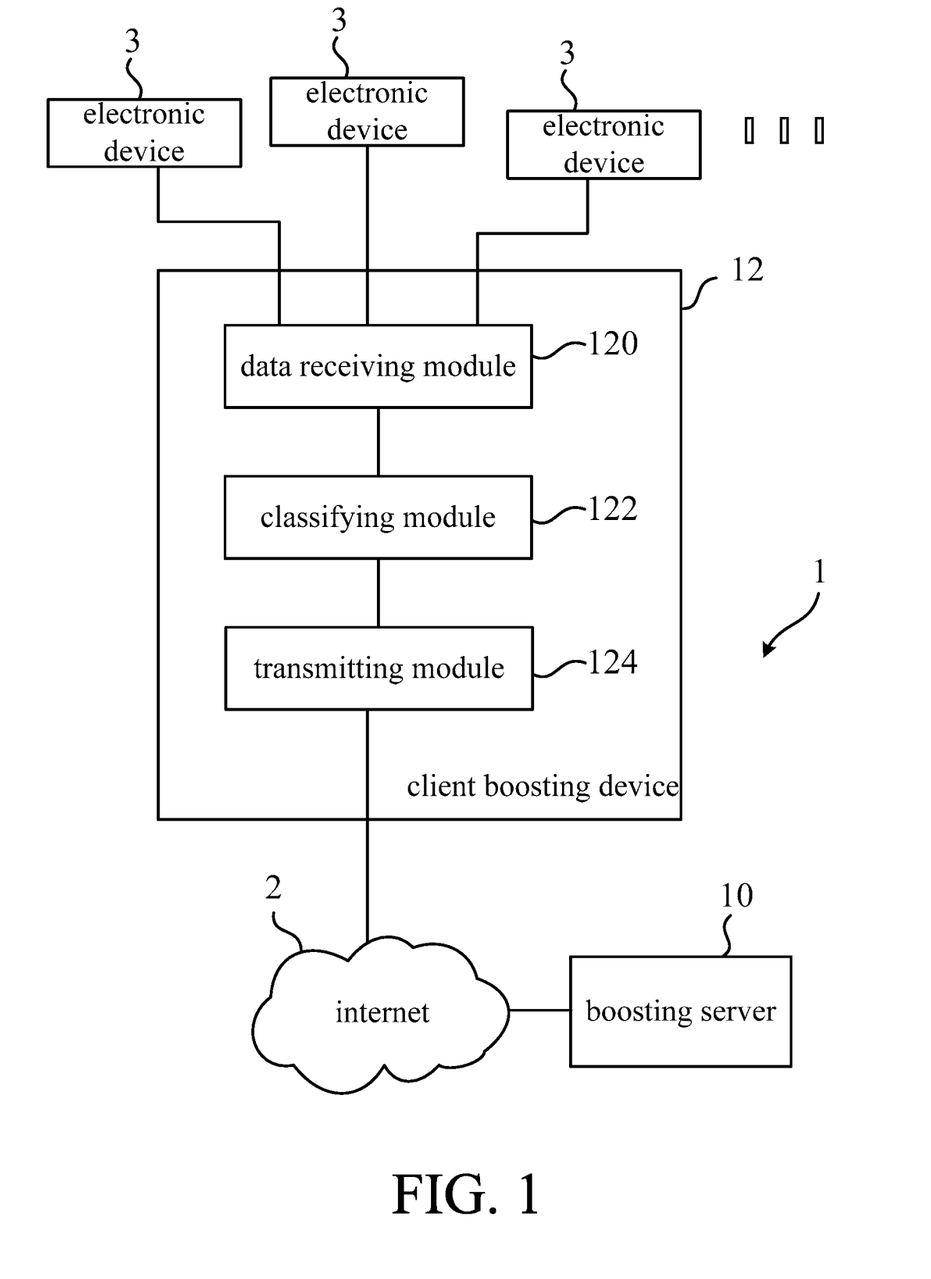
FIG. 1 is a functional block diagram illustrating a data transmission boosting system according to an embodiment of the present invention.

Please refer to FIG. 1. FIG. 1 is a functional block diagram illustrating a data transmission boosting system 1 according to an embodiment of the present invention. As shown in FIG. 1, the data transmission boosting system 1 includes a boosting server 10 and a client boosting device 12 connected to the internet 2, so that the client boosting device 12 can be connected to the boosting server 10 via the internet 2. The client boosting device 12 can also connect with electronic devices 3 to receive the data packets sent from the electronic devices 3 and transmit the data packets to the boosting server 10. It should be noted that the amount of the electronic devices 3 is not limited to three of the embodiments in FIG. 1. In practice, the amount of the electronic devices 3 connected to the client boosting device 12 can be one, two, or more than three.

In this embodiment, the client boosting device 12 further includes a data receiving module 120, a classifying module 122, and a transmitting module 124, wherein the classifying module 122 can be connected to the data receiving module 120 and the transmitting module 124 can be connected to the classifying module 122. In practice, the classifying module 122 can be established in a processing unit of the client boosting device 12. The data receiving module 120 can be connecting ports or wireless LAN receivers, such as WIFI receivers, to make wired or wireless connection with the electronic devices 3 to receive the data packets. The transmitting module 124 can be connecting ports or routers to connect with the internet 2 by wire connection.

The data receiving module 120 can receive the data packets generated by one or more electronic devices 3, and then the classifying module 122 classifies the data packets. The classifying module 122 stores a classifying model and calculates according to the classifying model and the packet information of the data packets, so as to classify each of the data packets as one of data packets to be boosted, non-boosting data packets, and unknown data packets. The classifying model further includes a plurality of classifying features, corresponding to the specific packet information, as the classifying criteria. For example, if the packet information of one data packet complies with at least one classifying features of data packets to be boosted listed in the classifying model, the data packet would be classified as the data packet to be boosted. If the packet information of another data packet complies with at least one classifying features of non-boosting data packet listed in the classifying model, the data packet would be classified as the non-boosting data packet. If the packet information of another data packet complies with none of the classifying features of the data packet to be boosted and the non-boosting data packet listed in the classifying model, the data packet would be classified as the unknown data packet. The aforementioned classify features can includes port information, IP address for delivery, domain string of the application layer, etc. For example, the classify features can include a game server IP address, and then the data packet which has the game server IP address would be classified as the data packet to be boosted.

The data packets would be classified as data packets to be boosted, non-boosting data packets, and unknown data packets by the classifying module 122. The transmitting module can receive these classified data packets and transmits them according to the classifying results. In detail, the data packets to be boosted would be transmitted to the boosting server 10 through the internet 2 by the transmitting module 124, and the non-boosting data packets would be transmitted into the internet 2 but would not be passed to the boosting server 10. As described above, the data transmission boosting system of the present invention classifies the data packets by hardware, so that it supports not only the electronic devices capable of installing the boosting application programs, such as computers or smart phones, but also those incapable of installing the boosting application programs, such as game consoles. It should be noted that the data packets to be boosted in this embodiment are, but not limited to, the game data packets of the online games requiring the high quality network environment. In practice, any kind of data packets generated by the application programs or device requiring high quality network environment or supposed to be boosted by the user can be classified as the data packets to be boosted according to the classifying features in the classifying model.

In this embodiment, the electronic devices 3 can be, but not limited to, terminal devices having wired or wireless connection with the data receiving module 120, such as smart phones, computers, laptops, or game consoles. The electronic devices 3 can also be other network switching devices such as routers, hubs, switches, bridges or broadband routers. Each of the network switching devices is capable of connecting with one or more terminal devices to receive the data packets from the terminal devices and then transmit the data packets to the client boosting device 12 via the data receiving module 120. By the aforementioned connecting structure, the client boosting device 12 extends the connecting capability for the terminal devices beyond the amount of the connecting ports of the data receiving module 120. For example, the data receiving module 120 has five connecting ports, and three of them are connected with three terminal devices and the others are connected with a WIFI router and a switch. Therefore, the data receiving module 120 can have more wired or wireless connections with more terminal devices via the switch and the WIFI router.

In this embodiment, the data packets classified as the data packets to be boosted by the classifying module 122 can be transmitted to the boosting server 10, and then the boosting server 10 can arrange or design an optimized route for the received data packets to boost the data transmissions. For example, if a game software or a game console is played with the connection to a game server, the client boosting device 12 can classify the game data packets from the game or the game console as the data packets to be boosted and transmit them to the boosting server 10, and then the boosting server would find the optimized route for transmitting the game data packets to the game server. For another example, if two players on different places around the world play the same game and connect with each other, the client boosting device 12 can classify the game data packets from one of the players as the data packets to be boosted and transmit them to the boosting server 10, and then the boosting server would find the optimized route for transmitting the game data packets to the terminal device of the other player. Besides, the data packets classified as the non-boosting data packets would be transmitted to their destinations through the normal routes on the internet 2. The non-boosting data packets would not be transmitted to the boosting server 10, so that their transmission routes are not optimized and then the data transmissions of the non-boosting data packets would be slower than those of the data packets to be boosted.

The hardware type data transmission boosting system described above can execute network boosting for not only the application programs but also the electronic devices incapable of installing the boosting application programs, such as game consoles or other devices for entertainments. In addition, the data transmission boosting system of the present can classify the received data packets precisely to selectively boost the specific application programs or the specific device, so as to reduce the loading and maintain the performance of the client boosting device and the boosting server.

Figure 2:
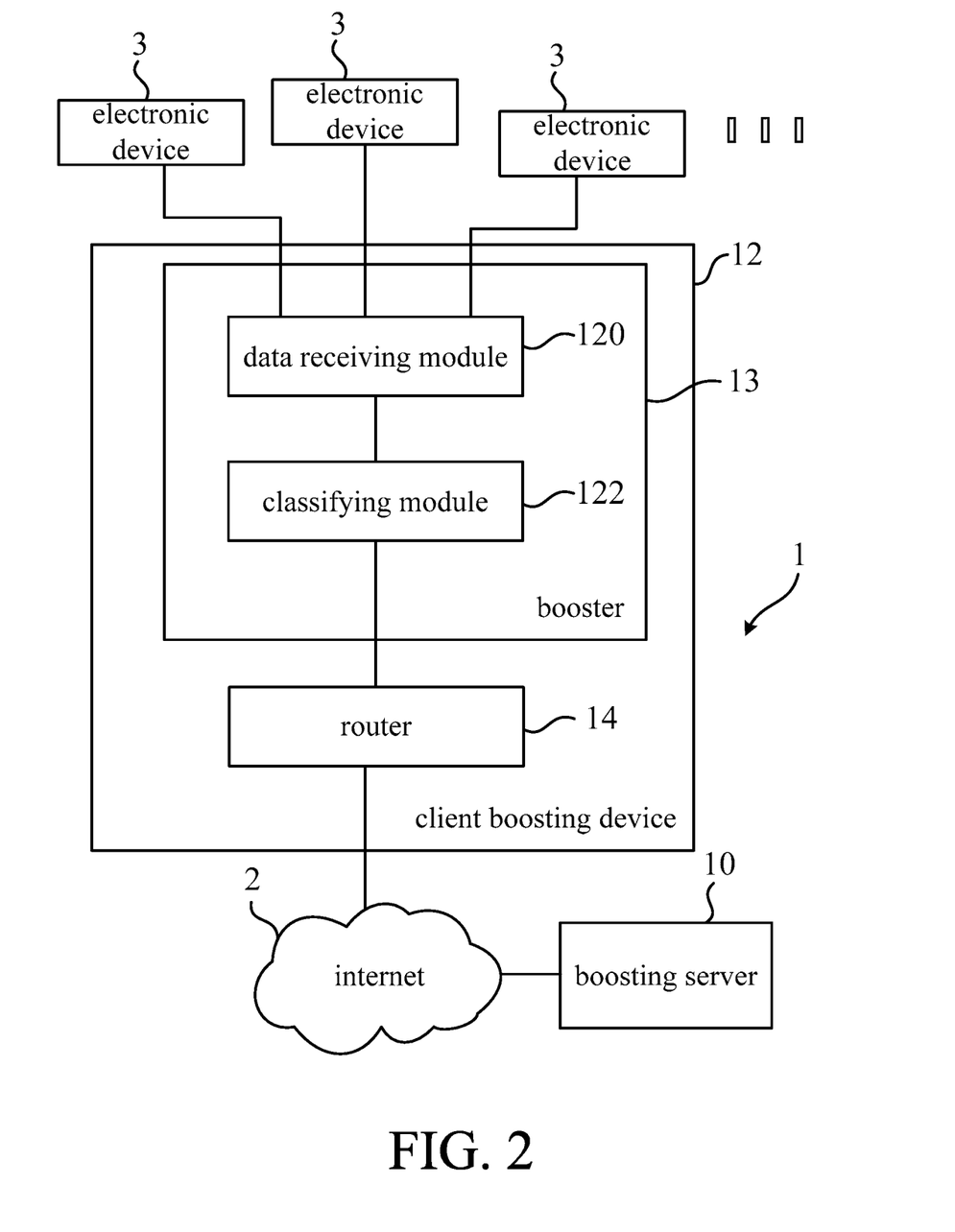
FIG. 2 is a functional block diagram illustrating a data transmission boosting system according to another embodiment of the present invention.

Please refer to FIG. 2. FIG. 2 is a functional block diagram illustrating a data transmission boosting system 1 according to another embodiment of the present invention. As shown in FIG. 2, the difference between the present embodiment and the last embodiment is that the client boosting device 12 in the present embodiment further includes a booster 13 and a router 14 connected to the booster 13. The booster 13 includes the data receiving module 120 and the classifying module 122. The router 14 can be connected to the internet 2, and it includes the transmitting module 124 or has the same function with the transmitting module 124, which is to transmit the data packets to be boosted to the boosting server and to transmit the non-boosting data packets to the internet. In practice, the router 14 can be Internet Service Provider (ISP) router. In other words, the client boosting device of the present invention can be a single device integrating the classifying function and the routing function, such as the client boosting device 12 in the last embodiment, or a combination of a general ISP router and a booster attached on the ISP router, such as the booster 13 and the router 14 in the present embodiment. It should be noted that the other elements of the data transmission boosting system 1 in the present embodiment are substantially the same with the corresponding elements in the last embodiment, and they would not be described in detail again.

Figure 3:
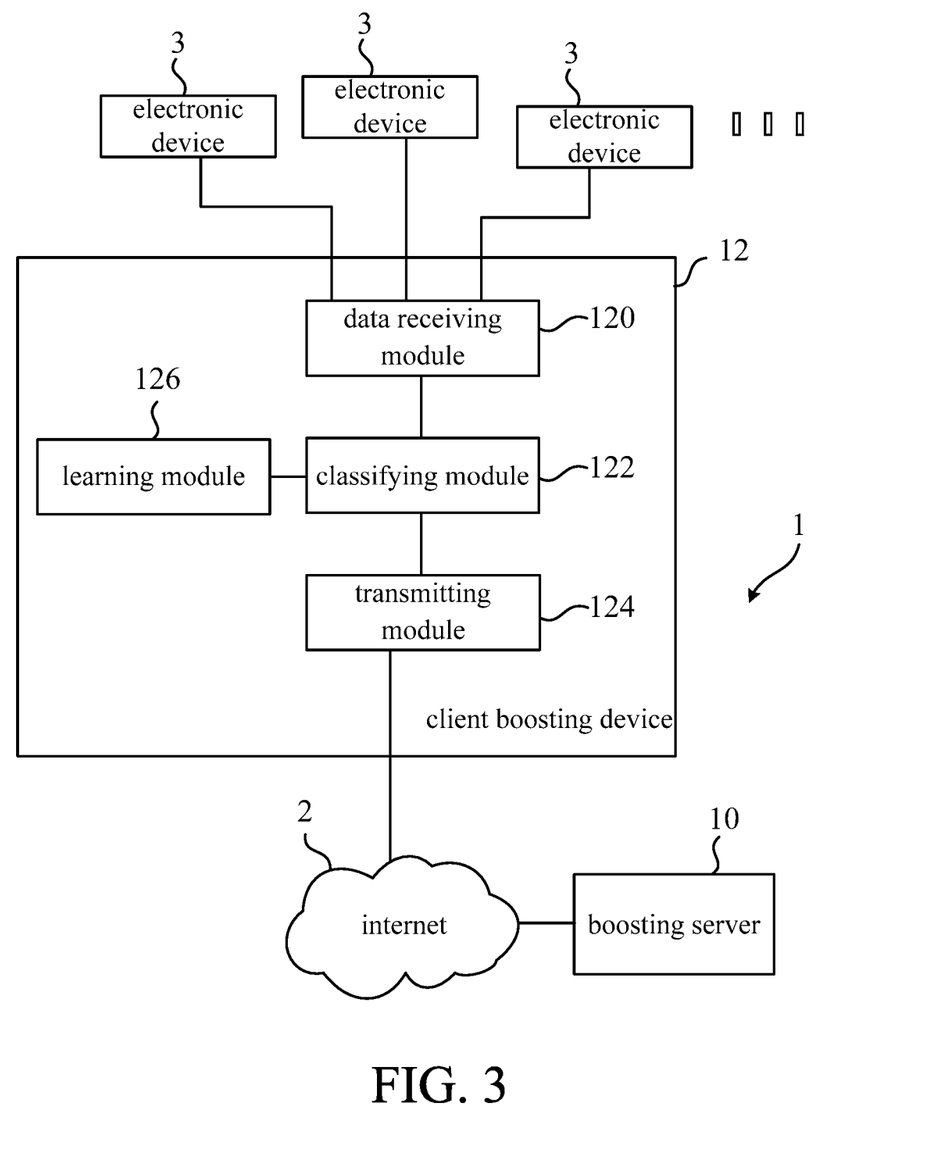
FIG. 3 is a functional block diagram illustrating a data transmission boosting system according to another embodiment of the present invention.

As aforementioned, the updating to the classifying model by the user or the manufacturer for the great quantity of new application programs and devices to be boosted would cause the user great inconvenience in the prior art. Please refer to FIG. 3. FIG. 3 is a functional block diagram illustrating a data transmission boosting system 1 according to another embodiment of the present invention. As shown in FIG. 3, the difference between the present embodiment and the aforementioned embodiments is that the client boosting device 12 of the data transmission system 1 in the present embodiment further includes a learning module 126, which is connected to the classifying module 122 and stores a machine learning program. The learning module 126 can receive the data packets classified as the unknown data packets from the classifying module 122, and then analyze the packet information of the unknown data packets by the machine learning program to obtain the classifying features for classifying the unknown data packets as data packets to be boosted or the non-boosting data packets. It should be noted that the other elements of the data transmission boosting system 1 in the present embodiment are substantially the same with the corresponding elements in the aforementioned embodiments, and they would not be described in detail again.

In detail, the machine learning program can include various algorithms, such as neural network, decision tree, support vector machine, linear discriminant analysis, maximum probability algorithm, Markov chain, etc. The present classifying features of the data packets to be boosted and the non-boosting data packet can be inputted into the algorithms to train the machine learning program. The trained machine learning program analyzes the packet information of the unknown data packets to find the classifying features for classifying the unknown data packets as the data packets to be boosted or the non-boosting data packets. Once the machine learning program finds these classifying features, the learning module 126 feedbacks them to the classifying module 122 to update the classifying model thereof. Therefore, next time, the data packets classified as the unknown data packets by the previous classifying model would be classified as the data packets to be boosted or the non-boosting data packets by the updated classifying model. Accordingly, when new application programs or devices are added into the data transmission boosting system of the present invention, it would automatically learn and update without manual operation by the user or the manufacturer to classify the data packets generated by the new application programs or devices.

In practice, it takes time for machine learning. It means that those data packets classified as the unknown data packets could not be classified as the data packets to be boosted or the non-boosting data packets timely. However, they must be transmitted to the destinations to avoid the packet loss. In the aforementioned embodiment, the client boosting device 12 can further include a storage or a database (not shown in the figures) connected to the classifying module 122 or the learning module 126. Once the classifying module 122 classifies a data packet as an unknown data packet, the unknown data packet would be copied and the copy would be stored in the storage or the database. A data packets classified as an unknown data packet merely means that the present classifying model and classifying features are not able to ascertain if the data packet is the data packet to be boosted or not, but it does not mean that the data packet is not the data packet that the user would like to boost. Therefore, for boosting all possible data packets to be boosted, the original unknown data packets would be transmitted by the transmitting module 124 to the boosting server 10 after copying the original unknown data packets and storing the copies in the storage or the database.

In practice, there might be a priority list for the application programs to be boosted. For example, the user would like to boost the frequently used application programs or devices. In one embodiment, the user or the manufacturer can make a higher priority of a specific application program or a specific device than others in the client boosting device, or arrange the priorities of all application programs and devices to be boosted. In the present invention, the data transmission boosting system also provides the function of automatically sorting the priorities to prevent the user or the manufacturer from manual operation.

Figure 4:
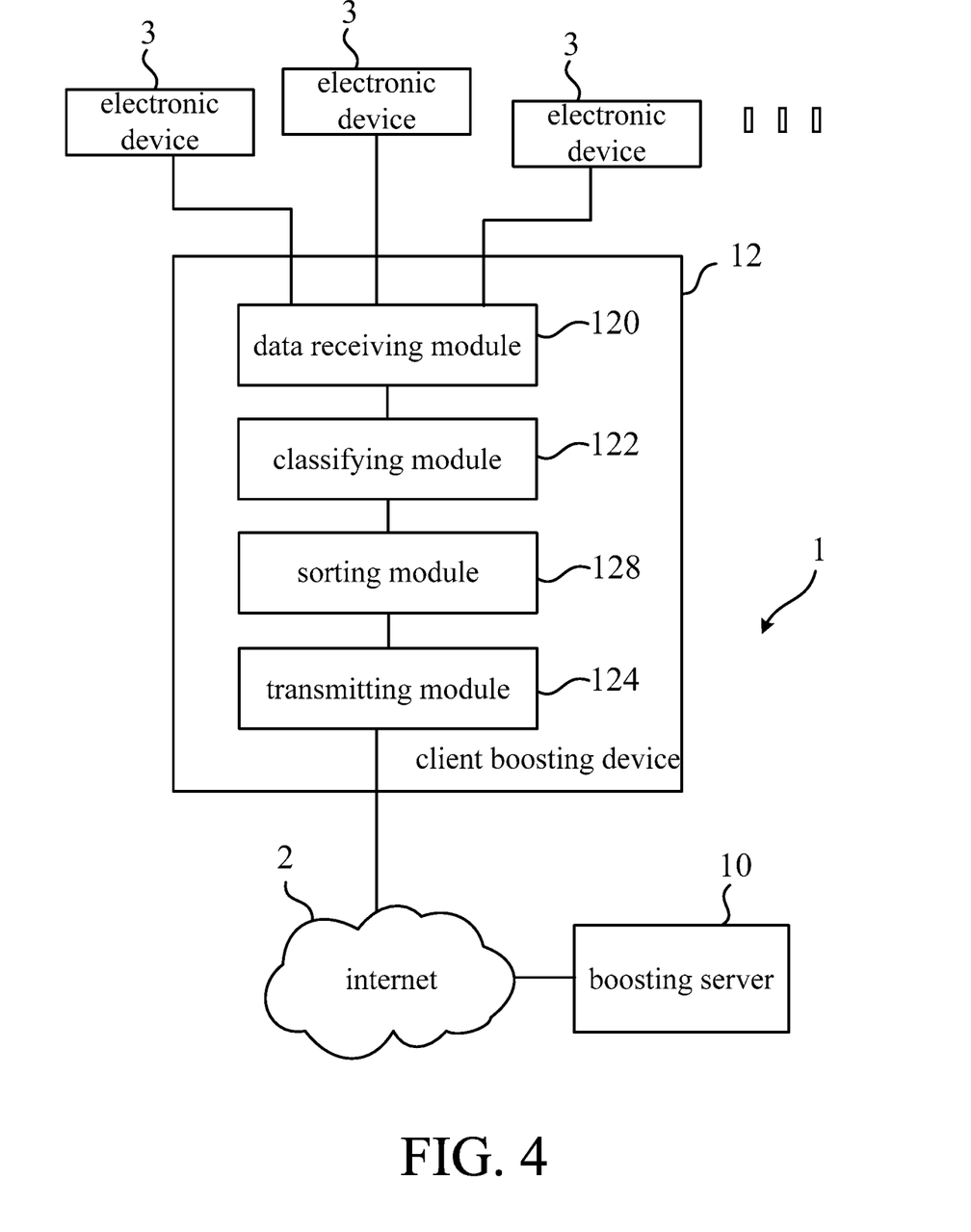
FIG. 4 is a functional block diagram illustrating a data transmission boosting system according to another embodiment of the present invention.

Please refer to FIG. 4. FIG. 4 is a functional block diagram illustrating a data transmission boosting system 1 according to another embodiment of the present invention. As shown in FIG. 4, the difference between the present embodiment and the aforementioned embodiments is that the client boosting device 12 of the data transmission system 1 in the present embodiment further includes a sorting module 128 connected to the classifying module 122 to receive the data packets to be boosted. The sorting module 128 can store a pre-determined priority list and transmit the data packets to the boosting server 10 according to the priority list. It should be noted that the other elements of the data transmission boosting system 1 in the present embodiment are substantially the same with the corresponding elements in the aforementioned embodiments, and they would not be described in detail again.

Besides the pre-determined priority list, the sorting module 128 can arrange the priorities according to the using histories for the application programs and the devices. For example, the sorting module 14 finds and marks the electronic devices 3 or the application programs which the data packets belong to from the data packets to be boosted respectively, and then arranges the priorities for the electronic devices 3 and the application programs according to the amounts of the correspond data packets to be boosted. It should be noted that the amounts of the data packets to be boosted can be grand totals. In other words, if the players played one specific game for a longer time than those for the other games, the grand total of the amount of the data packets generated by the specific game might be greater than those generated by the other games. That is to say, the quantity ratio of the data packets generated by the specific game is higher than those generated by the other games, and the sorting module 128 would make the specific game a higher priority to be boosted than those of the other games. Based on the priority sorting, the data transmission boosting system 1 can boost the electronic devices 3 or the application programs which are used frequently by the user. It should be noted that the arrangement for the priorities is not limited to the grand total of the amount of the data packets. In practice, the user is able to directly arrange the priorities of boosting for each of the electronic devices and the application programs.

Figure 5:
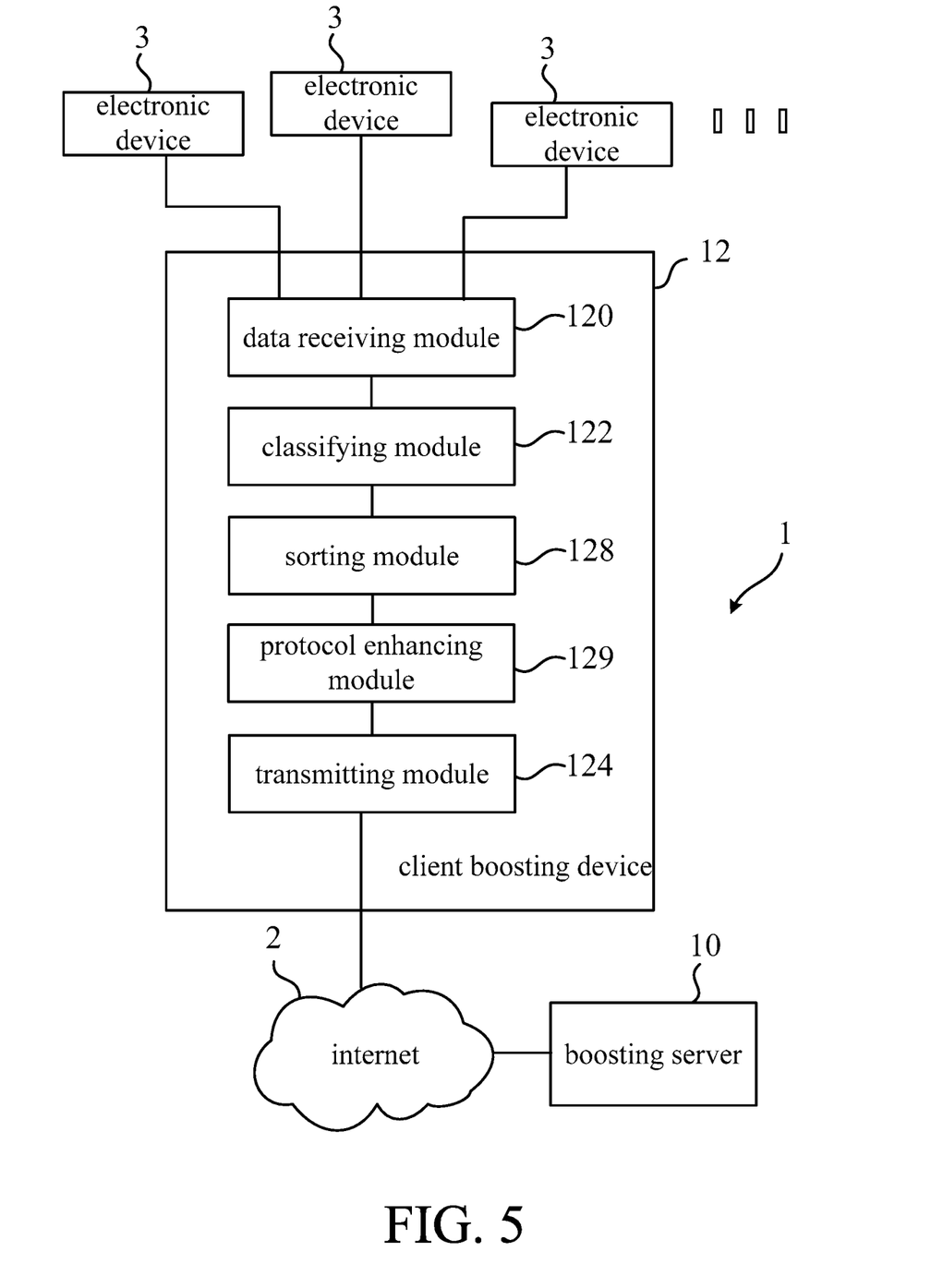
FIG. 5 is a functional block diagram illustrating a data transmission boosting system according to another embodiment of the present invention.

Please refer to FIG. 5. FIG. 5 is a functional block diagram illustrating a data transmission boosting system 1 according to another embodiment of the present invention. As shown in FIG. 5, the difference between the present embodiment and the aforementioned embodiments is that the client boosting device 12 of the data transmission system 1 in the present embodiment further includes a protocol enhancing module 129 connected between the sorting module 128 and the transmitting module 124. The protocol enhancing module 129 stores a protocol enhancing program. The protocol enhancing module 129 receives the data packets to be boosted and enhances the protocols of the data packets by the protocol enhancing program, so as to reduce the packet loss and improve the transmission speed. It should be noted that the other elements of the data transmission boosting system 1 in the present embodiment are substantially the same with the corresponding elements in the aforementioned embodiments, and they would not be described in detail again.

In the embodiment of FIG. 1, the client boosting device 12 of the data transmission boosting system 1 merely includes the classifying but no sorting module 128. In another embodiment, the aforementioned protocol enhancing module 129 can be connected between the classifying module 122 and the transmitting module 124 to enhance the protocols of the data packets to be boosted classified by the classifying module 122, so as to reduce the packet loss of the data packets to be boosted.

In practice, the classifying module 122, the learning module 126, the sorting module 128 and the protocol enhancing module 129 in the aforementioned embodiment can be built in a processing unit, such as a System on a Chip (SoC). Therefore, the present invention provides the network boosting function for the application programs and devices by a hardware but not software.

Figure 6:
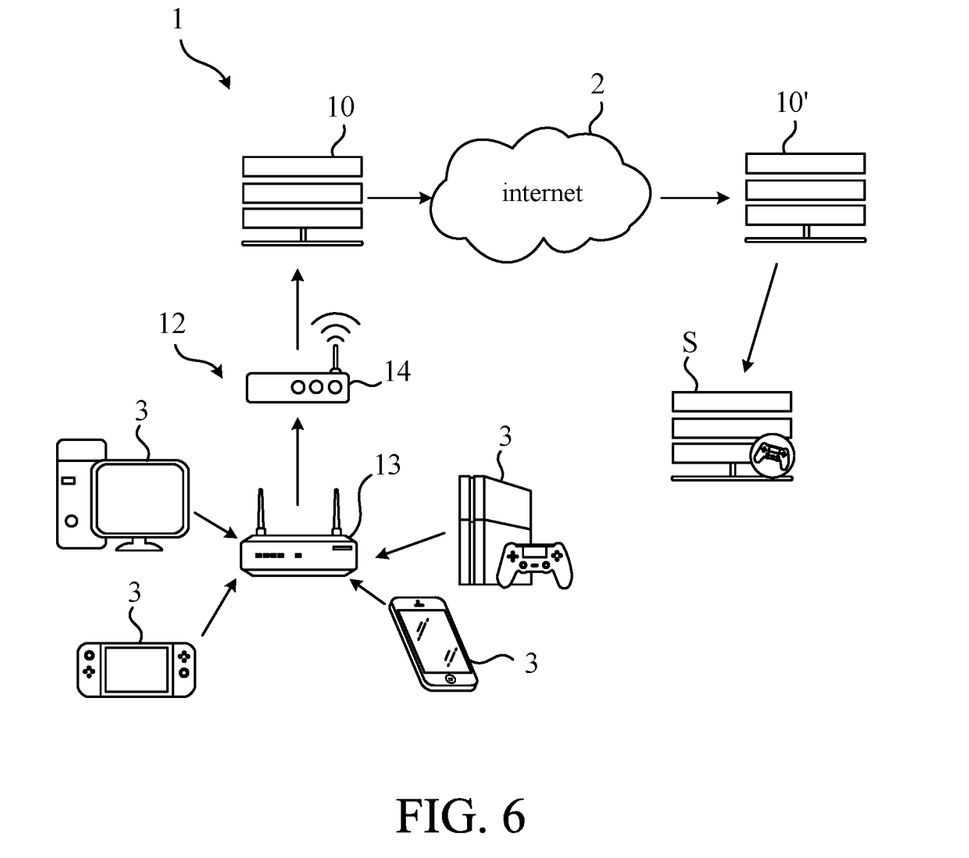
FIG. 6 is a schematic diagram illustrating a data transmission boosting system according to another embodiment of the present invention.

Please refer to FIG. 6. FIG. 6 is a schematic diagram illustrating a data transmission boosting system 1 according to another embodiment of the present invention. As shown in FIG. 6, the data transmission boosting system 1 includes a client boosting device 12 capable of connecting with various electronic devices 3 and boosting server 10 and 10' built on the internet 2. The client boosting device 12 further includes a booster 13 and a router 14. It should be noted that the elements of the data transmission boosting system in the present embodiment are substantially the same with the corresponding elements in the aforementioned embodiments, and they would not be described in detail again. In addition, the booster 13 can include the learning module 126, the sorting module 128 and the protocol enhancing module 129 described in the aforementioned embodiments besides the data receiving module 120 and the classifying module 122. The router 14 can include the transmitting module 124. To keep clear and tidy, FIG. 6 merely shows the booster 13 and the router 14 and omits those modules thereof.

In the present embodiment, there might be more than one boosting servers configured at different places. For example, one (or more) boosting server 10 can be built in Asian region and another boosting (or more) boosting server 10' can be built in European region or America region, so as to extend the network boosting all over the world. It should be noted that FIG. 6 shows the internet 2 between the boosting server 10 and the boosting server 10', but one of ordinary skills in the art would easily understand that all of the boosting server 10, the boosting server 10', the game server S, and the client are connected to the internet 2 and transmit data packets to each other through the internet 2.

When the player in Taiwan plays a game with game console (the electronic device 3) in FIG. 6, the data packets would be processed by classifying, machine learning, sorting and protocol enhancing as the data packets to be boosted and then transmitted to the boosting server 10 located in Taiwan or the neighboring country such as Japan or Korea. The boosting server 10 arranges the optimized route for the data packets to be transmitted to the game server S for this game. On the other hand, if the game server S is located on the opposite side of the world to the client and too far from the client, the boosting server 10 can arrange an optimized route to transmit the data packets the boosting server 10' first, and then the boosting server 10' can arrange another optimized route to transmit the data packets to the game server S. Therefore, the network boosting of the data transmission boosting system 1 can support the clients all over the world and supply low latency connection for them.

In addition, as shown in FIG. 6, the data transmission boosting system 1 executes network boosting for the specific devices or application programs by hardware, so as to prevent the user or the client from installing the network boosting software on their terminal devices. It would be more convenient, especially for those electronic devices incapable of installing network boosting software by the user, such as game consoles or other devices for entertainments.

As described above, the data transmission boosting system of the invention achieve network boosting function for the specific application programs and electronic device (game consoles or other devices for entertainments), and it can automatically sort the boosting priorities of the data packets transmission according to the requirements of the user and maintain the performance of the client boosting device and the boosting server. In addition, the data transmission boosting system of the invention can automatically update the classifying criteria by machine learning, so that the users or the clients would not necessary update it by themselves.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A data transmission boosting system, used for connecting at least one electronic device and an internet to receive and transmit a plurality of data packets sent by the at least one electronic device, and to selectively boost the transmission of the data packets, the data transmission boosting system comprising:

a boosting server connected to the internet and used to calculate for a shortest transmitting route; and a client boosting device connected to the internet, further comprising:

a data receiving module configured for connecting with the at least one electronic device and receiving the data packets; and a classifying module connected to the data receiving module and storing a classifying model having a plurality of classifying features, the classifying module being configured for classifying each of the data packets as one of data packet to be boosted, non-boosting data packet and unknown data packet according to the classifying model and the packet information of the data packets;

a transmitting module connected to the classifying module and the internet, configured for transmitting the data packets classified as the data packets to be boosted to the boosting server and transmitting the data packets classified as the non-boosting data packets to the internet; and a learning module connected to the classifying module, configured for analyzing the data packets classified as the unknown data packets by machine learning, so as to obtain a plurality of first classifying features for classifying the unknown data packets as the data packets to be boosted or the non-boosting data packets, the learning module updating the classifying model according to the first classifying features.

2. The data transmission boosting system of the claim 1, wherein the data receiving module of the client boosting device comprises a plurality of connecting ports for connecting with the at least one electronic device respectively, the at least one electronic device comprises at least one of a terminal device and a network switching device.

3. The data transmission boosting system of the claim 2, wherein the network switching device comprises one selected from the group consisting of routers, hubs, switches, bridges, and broadband routers.

4. The data transmission boosting system of the claim 1, wherein the client boosting device further comprises a sorting module connected to the classifying module, the sorting module is configured for receiving the data packets classified as the data packets to be boosted, respectively calculating the quantity ratio of the data packets to be boosted sent by the at least one electronic device, and sorting the priorities to transmit the data packets to be boosted sent by the at least one electronic device to the boosting sever.

5. The data transmission boosting system of the claim 4, wherein the client boosting device further comprises a protocol enhancing module connected to the sorting module for receiving the data packets classified as the data packets to be boosted, the protocol enhancing module stores a protocol enhancing program for enhancing the protocol of the data packets.

6. The data transmission boosting system of the claim 1, wherein the client boosting device further comprises a protocol enhancing module connected to the classifying module for receiving the data packets classified as the data packets to be boosted, the protocol enhancing module stores a protocol enhancing program for enhancing the protocol of the data packets classified as the data packets to be boosted.

7. The data transmission boosting system of the claim 1, wherein the data packets to be boosted are game data packets.

8. The data transmission boosting system of the claim 1, wherein the classifying features comprise port information, game IP address, and domain string of the application layer.

9. The data transmission boosting system of the claim 1, wherein the client boosting device further comprises a router, and the router comprises the transmitting module.

* * * * *